(12) United States Patent
Balamane et al.

(10) Patent No.: US 9,183,856 B1
(45) Date of Patent: Nov. 10, 2015

(54) SYSTEM AND METHOD FOR INTEGRATION OF MAGNETIC LIP AND NEAR FIELD TRANSDUCER IN HEAT ASSISTED MAGNETIC RECORDING WRITE HEADS

(71) Applicant: HGST Netherlands B.V., Amsterdam (NL)

(72) Inventors: Hamid Balamane, Portola Valley, CA (US); Alexander Goncharov, San Jose, CA (US); Vijay P. S. Rawat, San Jose, CA (US); Matteo Staffaroni, Pleasanton, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/530,611

(22) Filed: Oct. 31, 2014

(51) Int. Cl.
*G11B 5/39* (2006.01)

(52) U.S. Cl.
CPC ........................................ *G11B 5/39* (2013.01)

(58) Field of Classification Search
CPC ........... G11B 2005/0021; G11B 5/314; G11B 5/6088; G11B 5/1278; G11B 5/3133; G11B 5/4866; G11B 5/746; G11B 13/08; G11B 2005/0005; G11B 5/02
USPC ....................................................... 360/125.3
See application file for complete search history.

(56) References Cited

U.S. PATENT DOCUMENTS

| | | | |
|---|---|---|---|
| 6,999,384 B2 | 2/2006 | Stancil et al. | |
| 8,159,769 B2 | 4/2012 | Batra et al. | |
| 8,164,855 B1 * | 4/2012 | Gibbons et al. | 360/125.74 |
| 8,325,569 B1 | 12/2012 | Shi et al. | |
| 8,351,151 B2 | 1/2013 | Katine et al. | |
| 8,416,530 B2 * | 4/2013 | Gao et al. | 360/125.31 |
| 8,451,555 B2 * | 5/2013 | Seigler et al. | 360/59 |
| 8,456,964 B1 | 6/2013 | Yuan et al. | |
| 8,498,182 B1 | 7/2013 | Balamane et al. | |
| 8,509,037 B1 * | 8/2013 | Huang et al. | 369/13.24 |
| 8,553,505 B2 | 10/2013 | Rawat et al. | |
| 8,619,513 B1 | 12/2013 | Challener et al. | |
| 8,634,280 B1 * | 1/2014 | Wang et al. | 369/13.33 |
| 8,681,590 B2 * | 3/2014 | Zhou et al. | 369/13.33 |
| 8,721,902 B1 * | 5/2014 | Wang et al. | 216/22 |
| 8,842,383 B1 * | 9/2014 | Balamane et al. | 360/31 |
| 8,861,316 B2 * | 10/2014 | Yin et al. | 369/13.33 |
| 8,891,205 B2 * | 11/2014 | Zhou et al. | 360/125.3 |
| 8,934,198 B2 * | 1/2015 | Zou et al. | 360/125.31 |
| 8,947,985 B1 * | 2/2015 | Morelli et al. | 369/13.33 |
| 2013/0107390 A1 * | 5/2013 | Huang et al. | 360/31 |

OTHER PUBLICATIONS

Xu et al., "Relationship Between Near Field Optical Transducer Laser Absorption and Its Efficiency," IEEE Transactions on Magnetics, vol. 48, Issue 5, May 2012, pp. 1789-1793 (abstract only).
Challener et al., "Heat-assisted magnetic recording by a near-field transducer with efficient optical energy transfer," Nature Photonics, vol. 3, Apr. 2009, pp. 220-224.
Balamane et al., U.S. Appl. No. 14/170,462, filed Jan. 31, 2014.

* cited by examiner

*Primary Examiner* — Mark Blouin
(74) *Attorney, Agent, or Firm* — Zilka-Kotab, PC

(57) ABSTRACT

A system, according to one embodiment, includes a near field transducer having a conductive metal film and an aperture, and a magnetic lip adjacent the aperture. A back edge of the magnetic lip is positioned farther from a media facing surface than an upper portion of a back edge of the conductive metal film. Other systems, methods, and computer program products are described in additional embodiments.

19 Claims, 15 Drawing Sheets

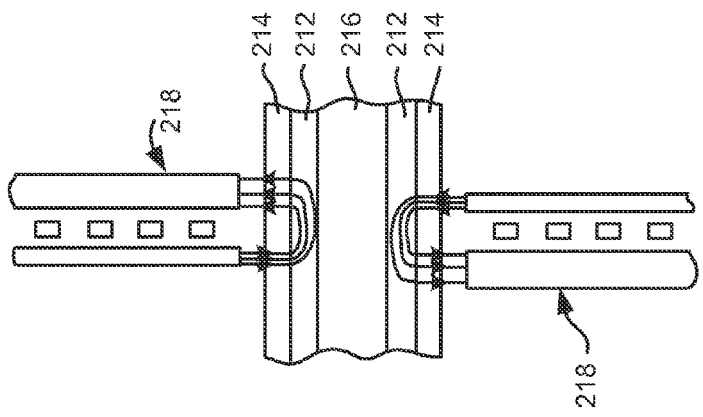
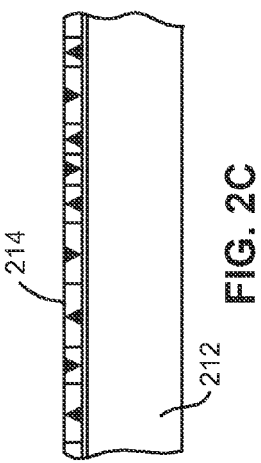
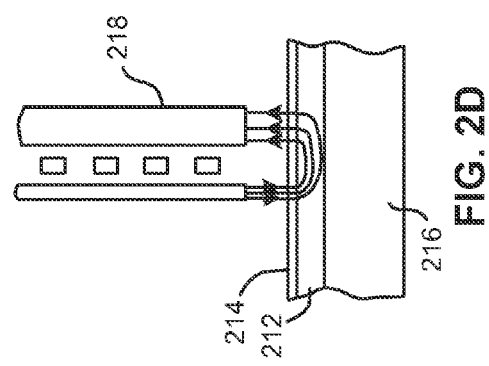
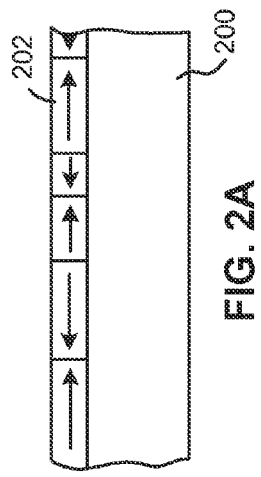
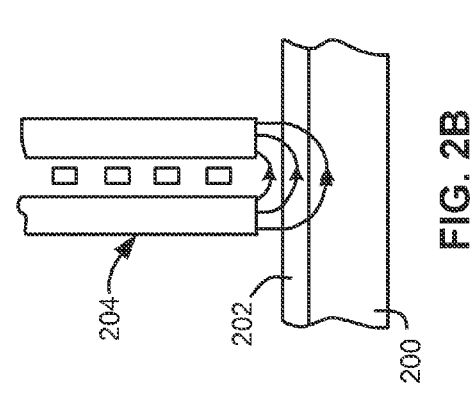

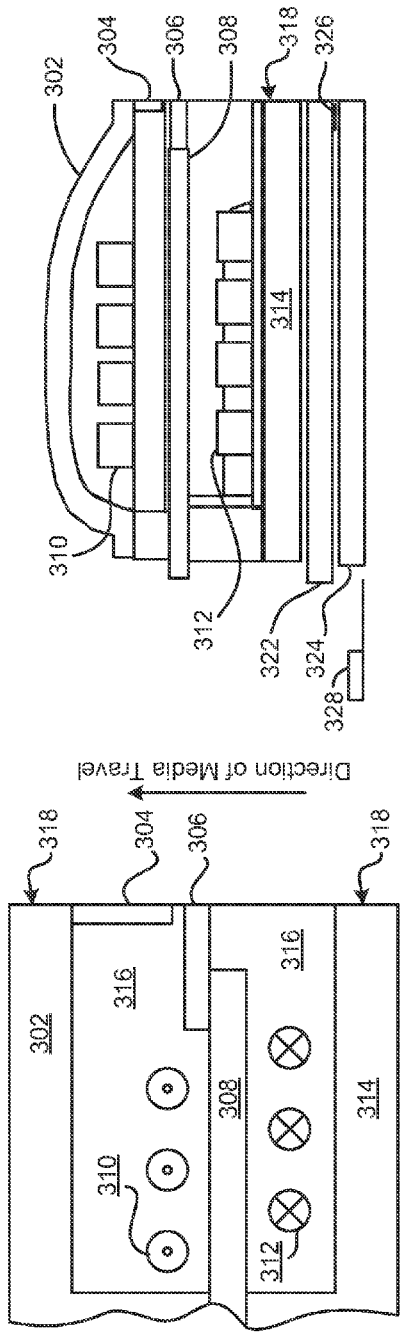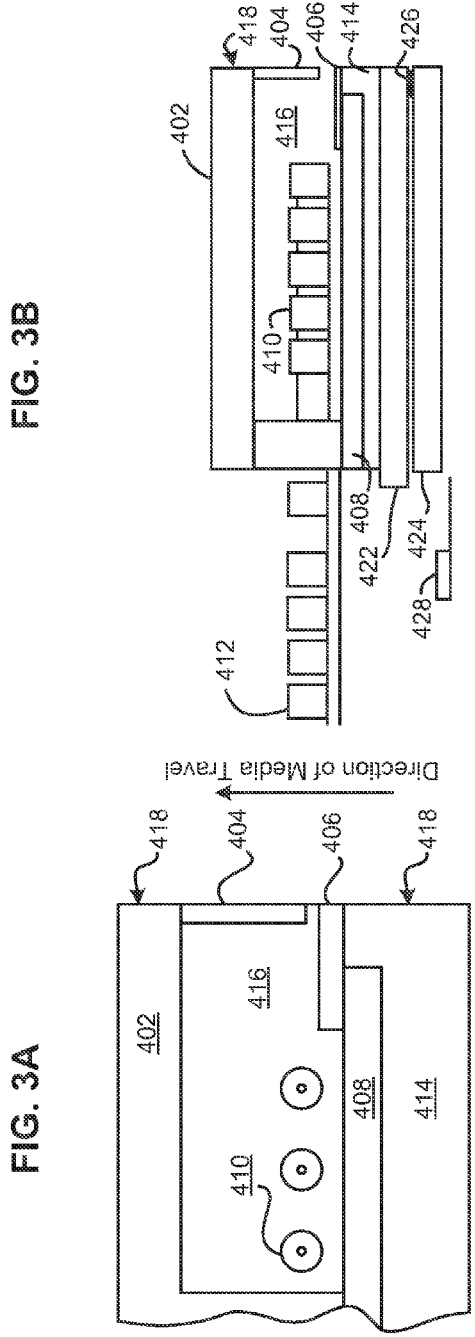

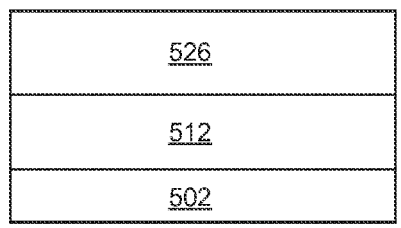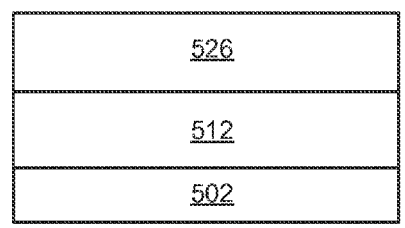
FIG. 6A
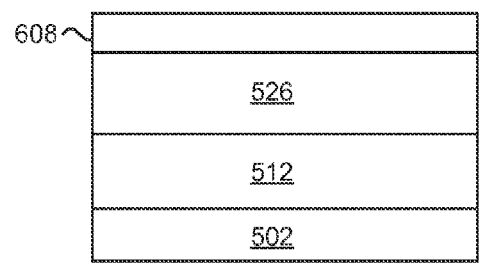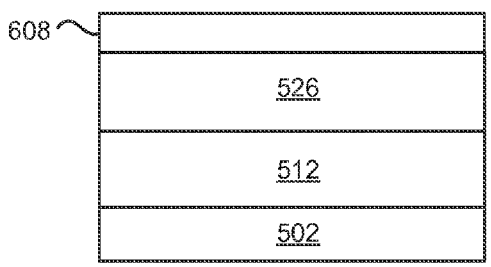
FIG. 6B
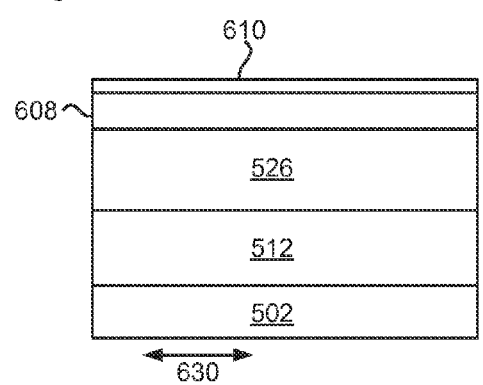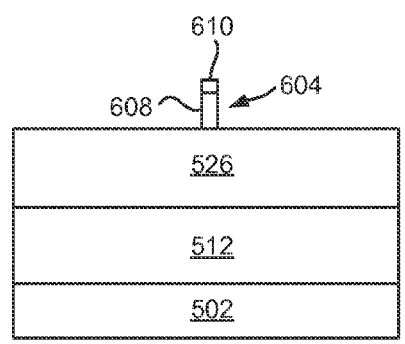
FIG. 6C

SYSTEM AND METHOD FOR INTEGRATION OF MAGNETIC LIP AND NEAR FIELD TRANSDUCER IN HEAT ASSISTED MAGNETIC RECORDING WRITE HEADS

FIELD OF THE INVENTION

The present invention relates to data storage systems, and more particularly, this invention relates to heat assisted magnetic recording (HAMR) write heads having improved magnetic lip and near field transducer (NFT) structure and methods for making the same.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating (in some disk drives, there is a load/unload ramp so contact with the disk does not occur); but, when the disk rotates, air is swirled by the rotating disk adjacent a media facing side of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives has reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials which will make data recording more challenging.

One solution has been proposed, which employs heat to lower the effective coercivity of a localized region on the magnetic media surface and writes data within this heated region. The data state becomes "fixed" upon cooling the media to ambient temperatures. This technique is broadly referred to interchangeably as "heat assisted magnetic recording", HAMR, or "thermally assisted (magnetic) recording", TAR or TAMR. HAMR can be applied to both longitudinal and perpendicular recording systems, although the highest density state of the art storage systems are more likely to be perpendicular recording systems. Heating of the media surface has been accomplished by a number of techniques such as focused laser beams or near field optical sources. U.S. Pat. No. 6,999,384 to Stancil et al., which is herein incorporated by reference, discloses near field heating of a magnetic medium.

SUMMARY OF THE INVENTION

A system, according to one embodiment, includes a near field transducer having a conductive metal film and an aperture, and a magnetic lip adjacent the aperture. A back edge of the magnetic lip is positioned farther from a media facing surface than an upper portion of a back edge of the conductive metal film.

A method, according to another embodiment, includes forming a conductive metal film, forming an aperture adjacent to the conductive metal film, and forming a magnetic lip adjacent to the aperture. A back edge of the magnetic lip is positioned farther from a media facing surface than an upper portion of a back edge of the conductive metal film.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for perpendicular recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. Various embodiments described herein includes process steps for forming preferred NFT structures, as will be described in further detail below.

In one general embodiment, a system includes a near field transducer having a conductive metal film and an aperture, and a magnetic lip adjacent the aperture. A back edge of the magnetic lip is positioned farther from a media facing surface than an upper portion of a back edge of the conductive metal film.

In another general embodiment, a method includes forming a conductive metal film, forming an aperture adjacent to the conductive metal film, and forming a magnetic lip adjacent to the aperture. A back edge of the magnetic lip is positioned farther from a media facing surface than an upper portion of a back edge of the conductive metal film.

Figure 1:
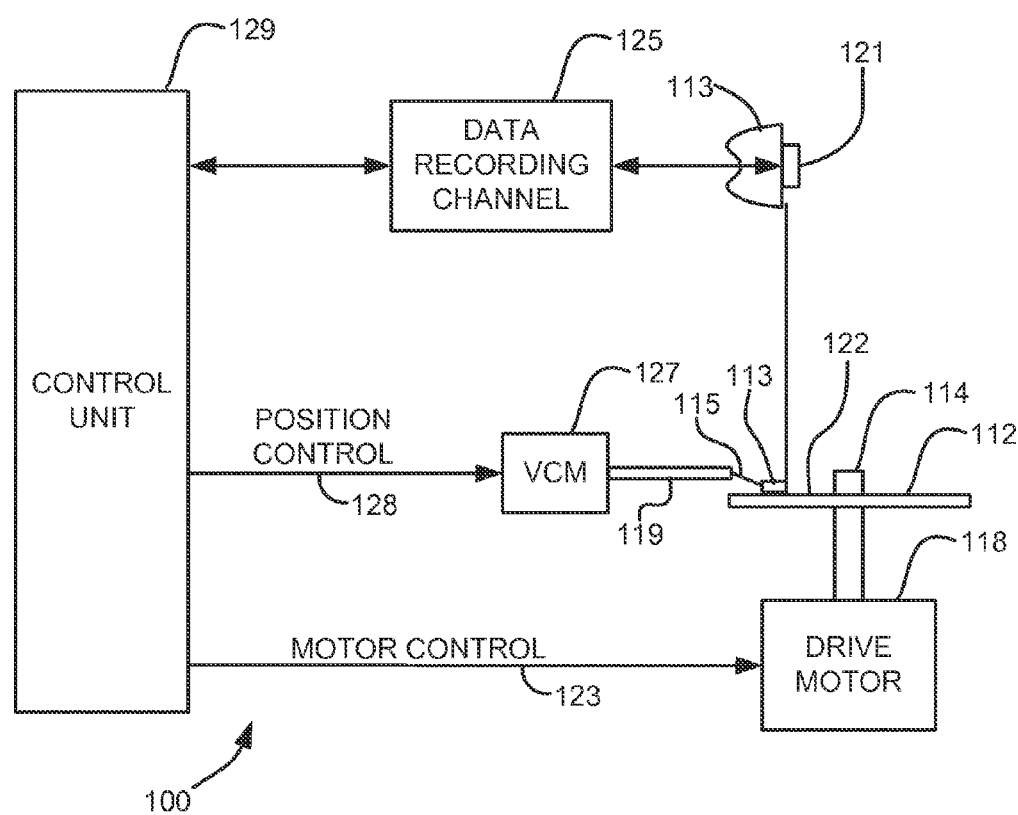
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121 (e.g., of a magnetic head). As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128.

The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

In some embodiments, the disk drive 100 of FIG. 1 may be implemented for HAMR. Accordingly, the disk drive 100 may include an apparatus, e.g., see 500 and/or 600 of FIGS. 5 and 6A-6H, respectively. Thus, the read/write heads 121 of the disk drive 100 may operate in combination with an NFT as described in detail below.

With continued reference to the disk drive 100 of FIG. 1, an interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers of the write portion by a gap layer at or near a media facing side of the head (sometimes referred to as an air bearing surface in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic domains in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording head 204, which may preferably be a thin film head, and a longitudinal recording medium, such as that of FIG. 2A.

FIG. 2C illustrates, schematically, a perpendicular recording head where, the orientation of magnetic domains substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic domains having their axes of magnetization substantially perpendicular to the surface of the medium. The flux is channeled by the soft underlying coating 212 back to the return pole of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing side 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the media facing side 318. The media facing side 318 is indicated across the right side of the structure.

Perpendicular writing is achieved by forcing flux through the stitch pole 308 into the main pole 306 and then to the surface of the disk positioned towards the media facing side 318.

FIG. 3B illustrates a piggyback magnetic head having similar features to the head of FIG. 3A. Shield 304 and return pole 314 flank the stitch pole 308 and main pole 306. Also sensor shields 322, 324 are shown. The read sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing side 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing side 418). The media facing side 418 is indicated across the right side of the structure. The trailing shield 404 may be in contact with the main pole 406 in some embodiments.

FIG. 4B illustrates another type of piggyback magnetic head having similar features to the head of FIG. 4A including looped coils 410, which loops around to form looped coils 412. Also, sensor shields 422, 424 are shown, with the upper sensor shield 422 spaced rom the writer by a nonmagnetic layer 414. The sensor 426 is typically positioned between the sensor shields 422, 424.

In FIGS. 3B and 4B, an optional heater 328, 428, respectively, is shown away from the media facing side of the magnetic head. A heater 328, 428 may also be included in the magnetic heads shown in FIGS. 3A and 4A. The position of this heater may vary based on design parameters such as where the protrusion is desired, coefficients of thermal expansion of the surrounding layers, etc.

HAMR, or equivalently TAR, is a method of recording information onto a magnetic recording medium, such as a disk, tape, etc. One general motivation for this invention relates to the design of a recessed dielectric waveguide and integration with a near-field optical transducer for HAMR. The waveguide core may be optimally recessed by a distance from the transducer and this space may be filled with low index dielectric material leading to significant enhancement of the optical efficiency. In one preferred embodiment, the low index dielectric material in the recessed space may be deposited after fabrication of the near-field transducer using an anisotropic deposition followed by deposition of the high index core material.

According to some embodiments, for HAMR to be effective, it may be beneficial to confine heat to about a single data track which may be approximately 40 nm wide or smaller. Candidate near-field optical sources typically use a low-loss metal (Au, Ag, Al, Cu, etc.) shaped in such a way as to concentrate surface charge motion at a tip apex located at the slider media facing side when light is incident. Oscillating tip charge may create an intense near-field pattern, heating the disk. Sometimes, the metal structure can create resonant charge motion (surface plasmons) to further increase intensity and disk heating. For example, when polarized light is aligned with the corner of a triangular-shaped gold plate, an intense near field pattern may be created at that corner. Resonant charge motion may occur by adjusting the triangle size to match a surface plasmon frequency to the incident light frequency. Another near-field transducer is the notch slot waveguide from microwave circuits applied to optical frequencies (also known as the C aperture). Light polarization may be aligned with the notch and incident light may concentrate surface charge at the tip of the notch.

Figure 5:
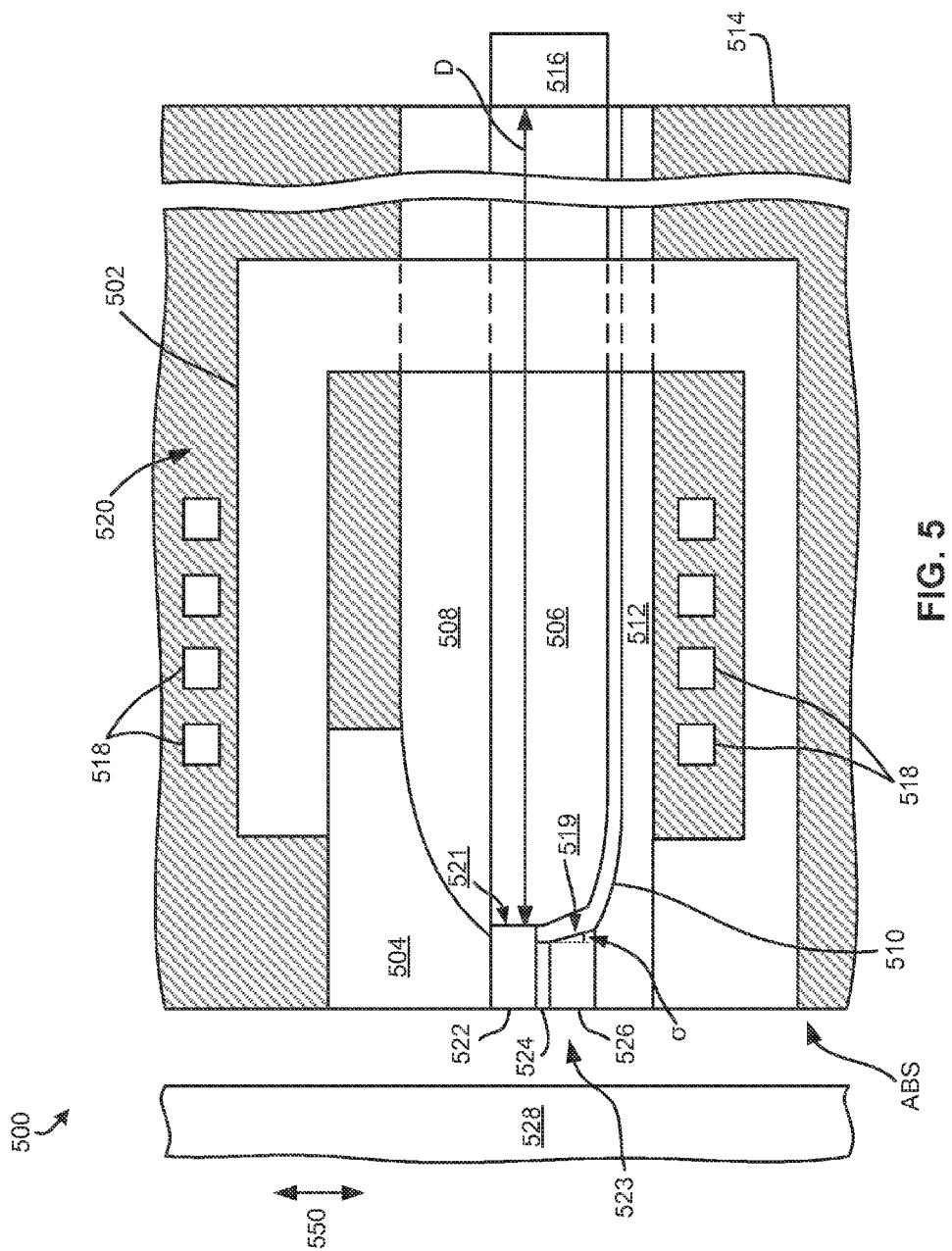
FIG. 5 is a partial cross sectional view of a thin film perpendicular write head according to one embodiment.

FIG. 5 depicts a partial cross sectional view of a magnetic HAMR head 500, in accordance with one embodiment. As an option, the present head 500 may be implemented in conjunction with features from any other embodiment listed herein, such as those described with reference to the other FIGS. Of course, however, such head 500 and others presented herein may be used in various applications and/or in permutations which may or may not be specifically described in the illustrative embodiments listed herein. Further, the head 500 presented herein may be used in any desired environment.

It should be noted that the dimensions of the components illustrated in FIG. 5 may be exaggerated (e.g., larger than would typically be observed) relative to other components, which are in no way intended to limit the invention. Moreover, to simplify and clarify the structures presented, and spacing layers, insulating layers may be omitted from the subsequent figures and/or descriptions. Thus, although FIG. 5 illustrates an illustrative cross sectional view of a magnetic HAMR head 500, additional and/or alternative layers and combinations of layers may be used in the structure as would be appreciated by one of ordinary skill in the relevant art upon reading the present disclosure, including insulating layers, adhesion layers, etc. In addition, any of the layers described in relation to head 500 may be comprised of multiple layers, which may or may not be of the same material.

Referring now to FIG. 5, the head 500 includes a return pole 502 which is coupled to the main pole 504, a portion of the main pole 504 being positioned at the media facing side. The return pole 502 may include a conventional magnetic alloy or material. Exemplary materials for the return pole 502 include Co, Ni, Fe, Cr etc. and/or combinations thereof. Moreover, the main pole 504 may include any known suitable material, such as NiFe, CoFe, CoNiFe, CoFeCr etc.

The head 500 also includes an optical waveguide 506, surrounded by cladding layers 508, 510, 512. According to the present embodiment, the cladding layers 508, 510, 512 are illustrated as extending to at least the flex side 514; although in other embodiments, some or all of the cladding layers may not extend to the flex side 514.

Moreover, one of the cladding layers 510 forms a recess between the waveguide 506 and the NFT 523. Further, cladding layer 510 is also directly adjacent a side of the waveguide 506. e.g., extending parallel to a longitudinal axis of the waveguide 506 along its stripe height. Additionally, another one of the cladding layers 512 extends along a leading edge side of the NFT 523, thereby forming a portion of the media facing side. Thus, in some embodiments, the waveguide 506 may be positioned adjacent two cladding layers 510, 512, e.g., as illustrated in FIG. 5.

In various embodiments, the cladding layers 508, 510, 512 may include any material as would be known to one of ordinary skill in the relevant art, such as $Al_2O_3$, $SiO_2$, etc., and/or their composites. Moreover, the cladding layers 508, 510, 512 may include same, similar or different materials, depending on the desired embodiment.

The waveguide 506 extends to the flex side 514 having a near field optical source 516, e.g., a laser. However, in other approaches, the optical waveguide 506 may be spaced from the NFT by between about 100 nm and about 10 nm, but may be higher or lower depending on the desired embodiment.

The optical source 516 emits an optical signal, e.g., light, that is desirably directed along the optical waveguide 506, towards the NFT. Thus the waveguide 506 is generally used to deliver light energy to the NFT which creates a small hot-spot on the surface of the media disk 528, thereby inducing isolated heating of the disk 528 surface. The waveguide 506 preferably includes a material having a high refractive index (e.g., at least higher than the cladding layers 508, 510, 512), thereby assisting in keeping the optical signal, emitted from the optical source 516, within the waveguide 506. Illustrative materials for the waveguide 506 include, but are not limited to, $TaO_x$, $TiO_x$, $NbO_x$, $ZrO_x$, $HfOx$, etc., and/or their composites. Other exemplary materials for the waveguide 506 may include $Ta_2O_5$, and/or $TiO_2$.

The cladding layers 508, 510, 512 preferably include a material having a low refractive index, e.g., so as to keep the optical signal confined within the sidewalls of the waveguide. In general, a low refractive index material may include any material having refractive index below about 1.75, but could be higher or lower depending on the desired embodiment. In other approaches, the low refractive index may be lower than the refractive index of the waveguide 506. Illustrative materials for the cladding layers 508, 510, 512 include refractive oxides such as $AlO_x$, $SiO_x$, etc. or other conventional materials having a desirably low refractive index.

As shown, the waveguide 506 may have an approximately uniform cross section along its length. The thickness of the waveguide 506 may be nominally between about 200 nm and about 400 nm, but is preferably thicker than the aperture 524.

However, as well known in the art, the waveguide 506 may have a number of other possible designs including a planar solid immersion mirror or planar solid immersion lens which have a non-uniform core cross section along the waveguide's length. Thus, according to various approaches, the waveguide 506 may have any other cross sectional profile as selected by one of ordinary skill in the relevant art, such as a rectangular, square, triangular, circular, etc., cross section.

With continued reference to FIG. 5, the head 500 also includes write coils 518 positioned in a conventional insulation layer 520, e.g., alumina. As would be appreciated by one skilled in the art, the write coils may assist the head 500 perform write operations by inducing a magnetic field in the return pole 502 which is transferred to the main pole 504 and concentrated in a magnetic lip 522 which is used to write to a magnetic medium 528 (e.g., a magnetic disk) spaced therefrom. In other words, the magnetic lip 522 may serve as a write pole. Thus, the magnetic lip 522 is preferably magnetically coupled to the main pole 504, and the return pole 502. In other embodiments, the main pole 504 may have a step formed near the lower portion of the main pole 504.

It is also preferred that the magnetic lip 522 has a straight and substantially vertical (perpendicular to the plane of deposition) back edge 521, e.g., farthest from the media facing surface of the head 500. Various methods of forming the magnetic lip 522 capable of achieving a substantially vertical back edge 521 are described below, e.g., see FIGS. 6A-7D. It should further be noted that any one or more of the steps described below may be implemented to form the head 500 illustrated in FIG. 5.

Additionally, the NFT is illustrated as including an aperture 524 (e.g., a C aperture) and a conductive metal film main body 526 therebelow. According to one approach, the conductive metal film main body 526 may have a circular cross sectional shape with a notch extending therefrom, e.g., as would be appreciated by one skilled in the art as a "lollipop antenna." However, depending on the desired embodiment, the conductive metal film main body 526 may have any shape.

Figure 9:
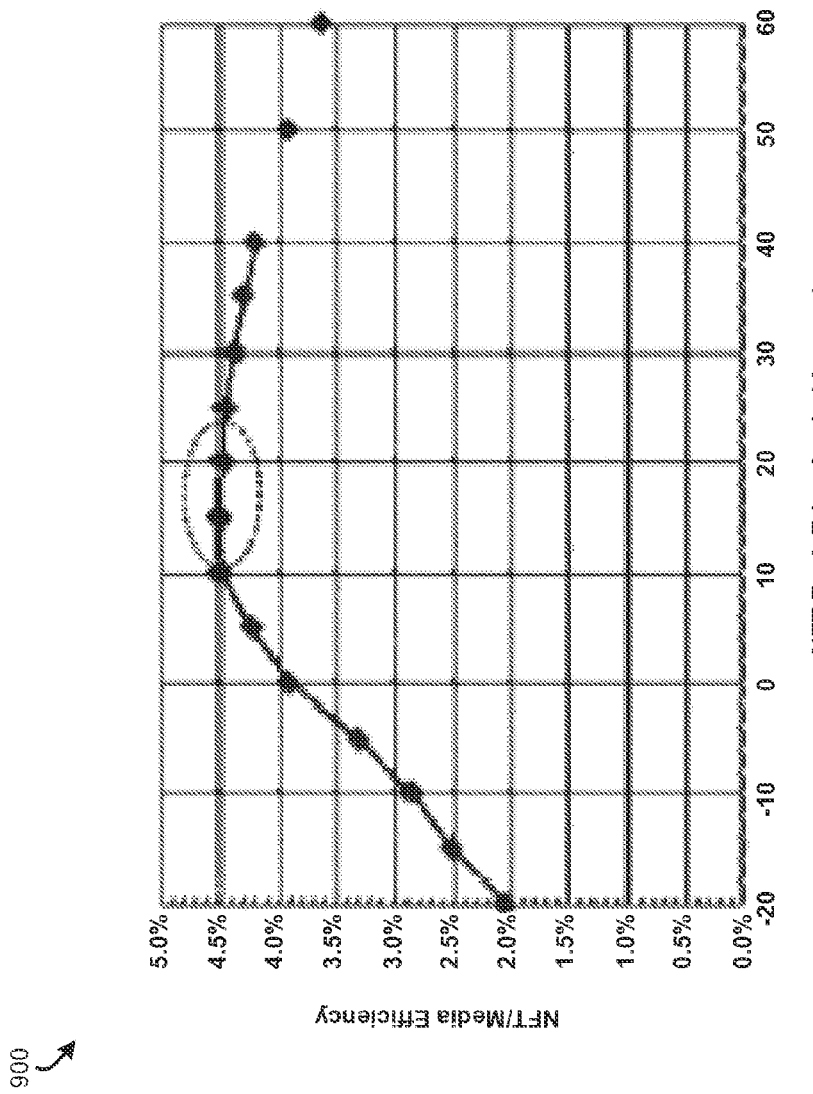
FIG. 9 is a graph of the NFT/media efficiency compared to the angle of the back edge of the NFT.

According to one approach, which is in no way intended to limit the invention, the aperture 524 may include $SiO_2$. It should be noted that the main body 526 is illustrated according to a preferred embodiment in which a back edge 519 thereof is defined at an angle σ relative to the intended direction of media travel 550. Referring momentarily to FIG. 9, a graph 900 depicts the efficiency of an exemplary NFT relative to the back edge profile of an NFT, e.g. angle σ. Looking to the graph 900 it becomes apparent that the preferred angle range for the back edge profile of an NFT is between about 0 degrees and about 30 degrees, more preferably between about 10 degrees and about 25 degrees, but could be higher or lower depending on the desired embodiment. For example, depending on the materials, dimensions, desired characteristics, etc. of a given embodiment, the preferred angle range for the back edge profile of an NFT may be different.

It follows that the partial cross sectional view of the head 500 in FIG. 5 is not meant to limit the structure of the NFT as described herein. Moreover, the process of forming an exemplary NFT structure will be described in further detail below, with reference to FIGS. 6A-6S.

Referring still to FIG. 5, the NFT 523 includes aperture 524 and conductive metal film main body 526 which are used to assist in performing write operations. As described above, an NFT may be used to heat the magnetic medium, thereby softening the magnetic stability of the magnetic grains thereof. The energy to heat the magnetic medium may be supplied to the NFT 523 from the optical source 516 via the waveguide 506. In preferred embodiments, this allows for the magnetic field concentrated at the magnetic lip 522 to influence the magnetic orientation of the magnetic grains on the medium 528, e.g., to perform a write operation. Therefore, it is desirable that the NFT is located adjacent the magnetic lip 522, e.g., as illustrated in FIG. 5.

According to one embodiment, the magnetic lip 522 may have a nominal length (as measured from the media facing side in the stripe height direction) approximately equal to that of the main body 526, but the lengths may be different, e.g., as determined by the performance and/or properties of the near field optical source, NFT and/or magnetic lip. Moreover, according to various other embodiments, the length of the magnetic lip 522 may vary from about 50 nm to about 500 nm, more preferably between about 50 nm and about 200 nm, but may be higher or lower depending on the desired embodiment.

As alluded to above, conventional products are plagued by the inability to form desirable back edge profiles of magnetic lips and NFT layers using a singular patterning step. This is due in large part to the different mill rates of the different materials used to form the individual layers which make up the magnetic lip and NFT layers of conventional products. The relative mill rates of different materials that are present in HAMR NFT are exemplified in Table 1.

TABLE 1

| Material | Hi power mill rate @10 degrees (A/min) | Hi power mill rate @70 degrees (A/min) |
|---|---|---|
| Au | 445 | 92 |
| Cr | 198 | 78 |
| SiO2 | 173 | 77 |
| CoFe | 155 | 77 |
| AlO$_x$ | 52 | 88 |

In sharp contrast to the conventional practice of milling the back edge of the magnetic lip and NFT layers at the same time, various embodiments described herein include different process steps for performing multiple milling steps which result in a preferred structure.

Figure 6D:
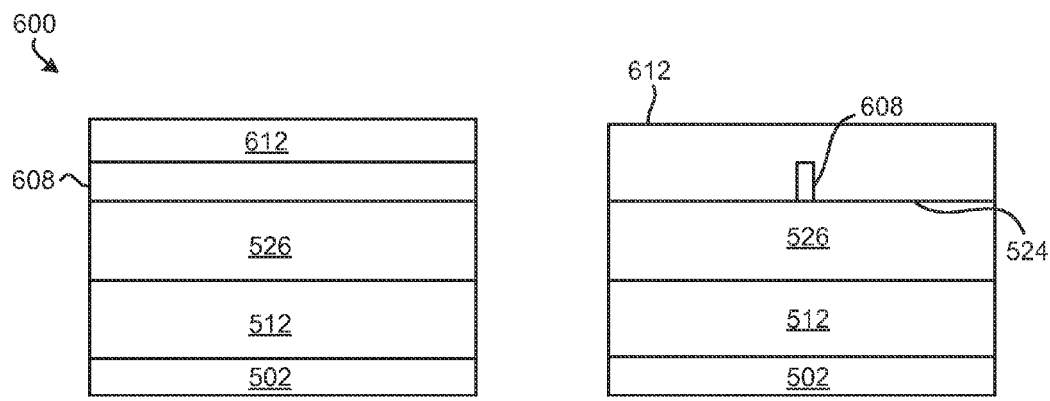
FIGS. 6A-6R are partial cross sectional side views and partial media facing surface views of process steps for forming a HAMR write head according to one embodiment.
FIG. 6S is a partial side view the HAMR write head of FIGS. 6A-6R.
Figure 6E:
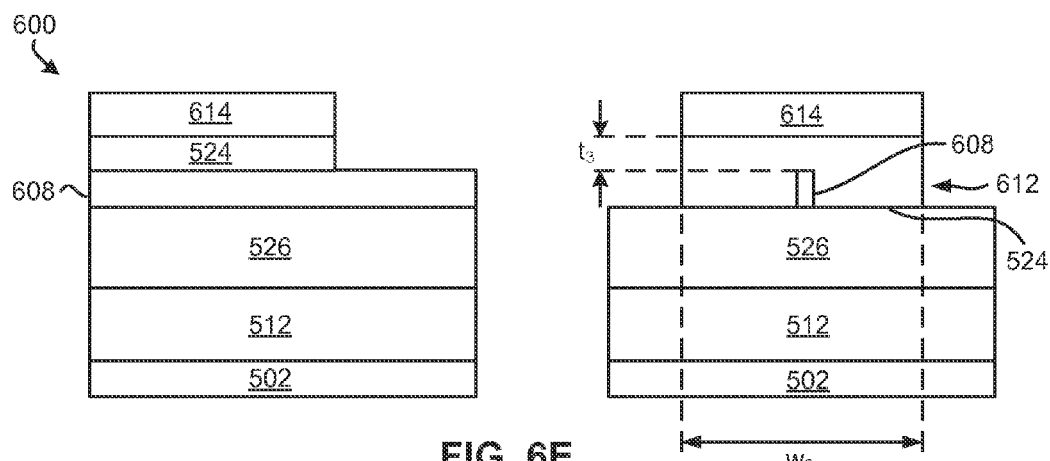
Figure 6F:
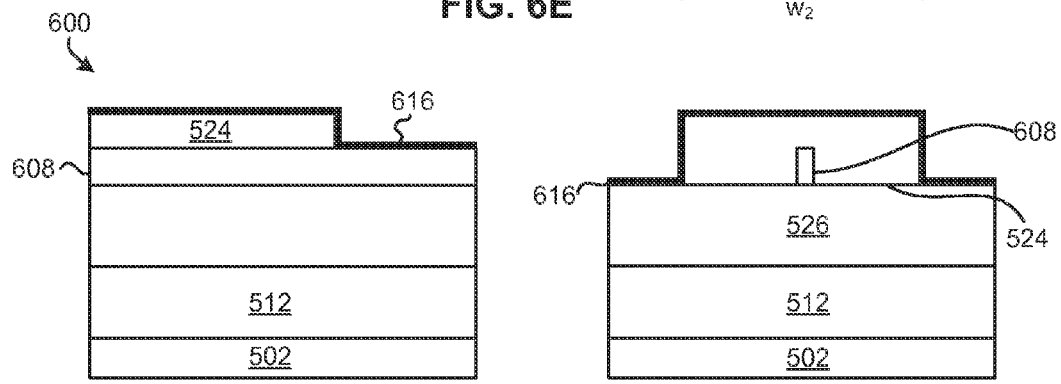
Figure 6G:
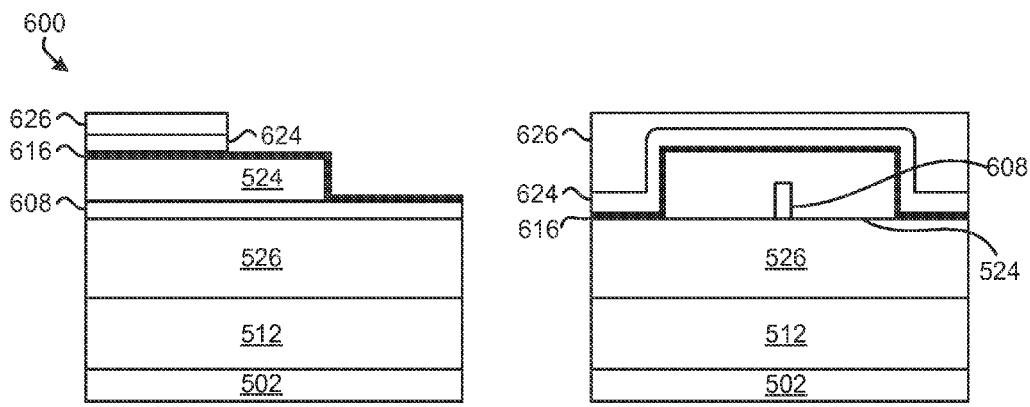
Figure 6H:
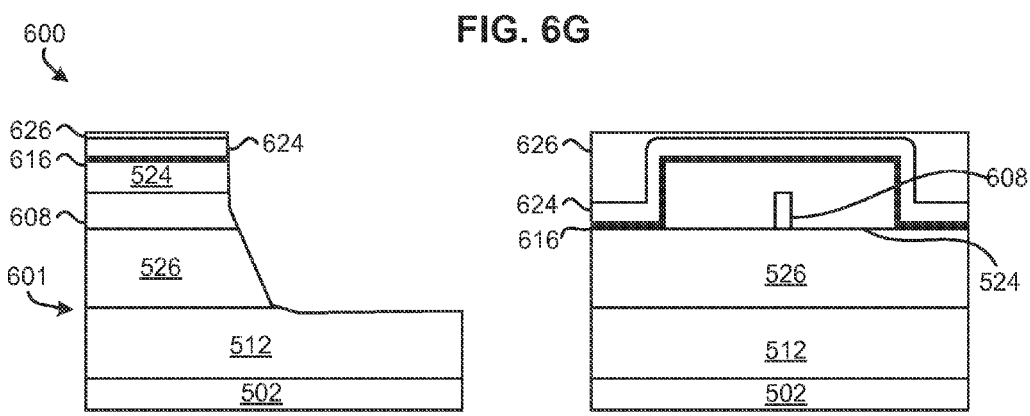
Figure 6I:
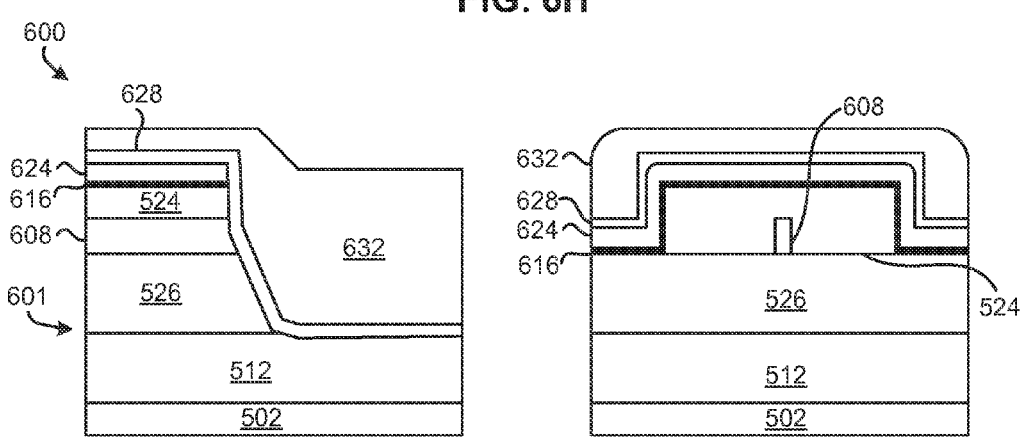
Figure 6J:
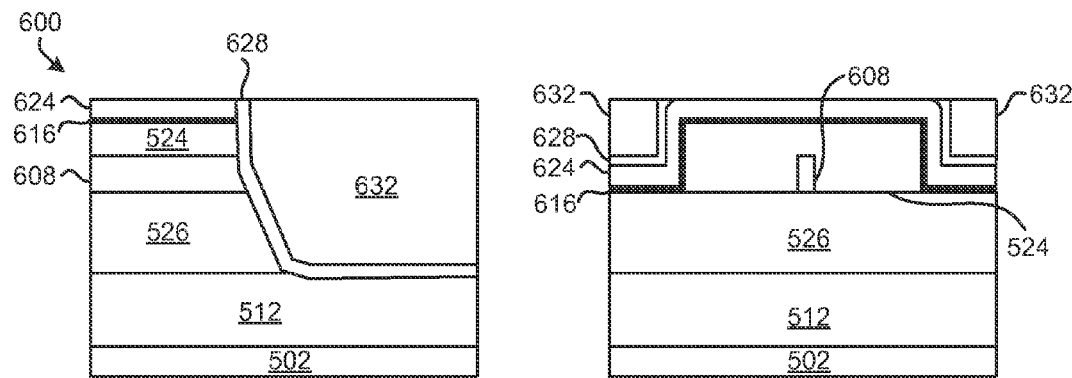
Figure 6K:
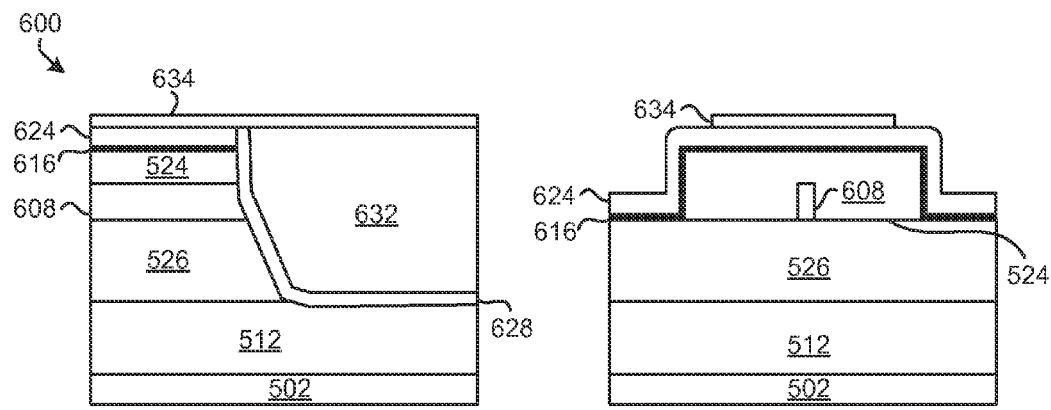
Figure 6L:
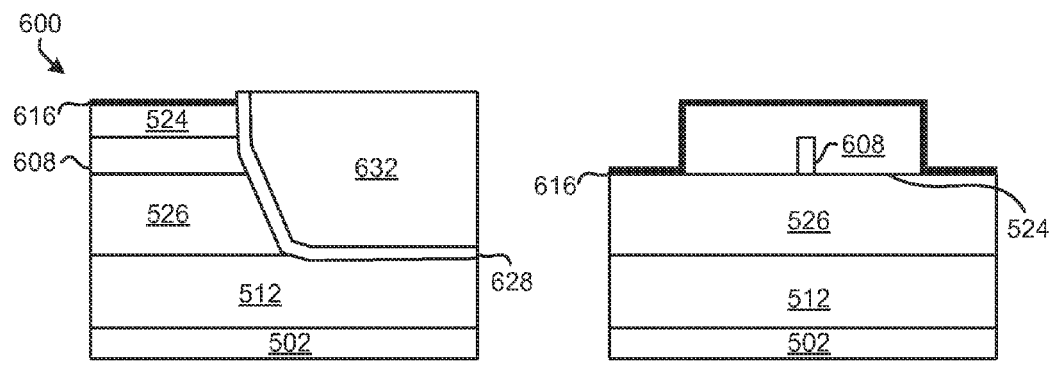
Figure 6M:
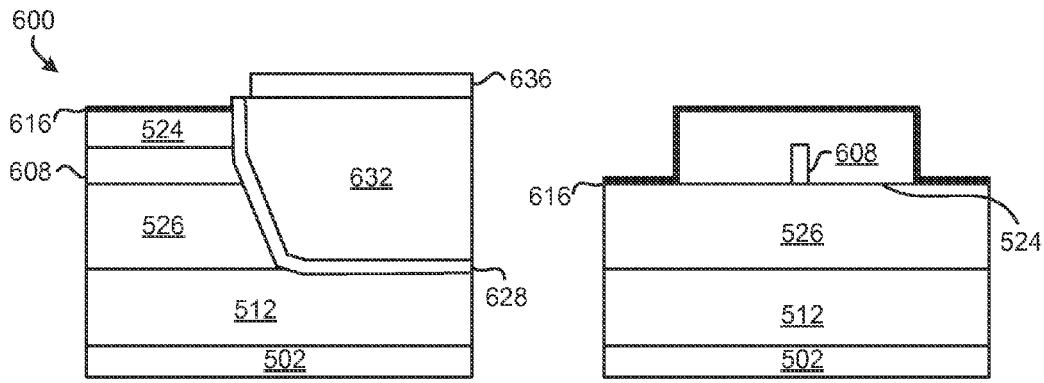
Figure 6N:
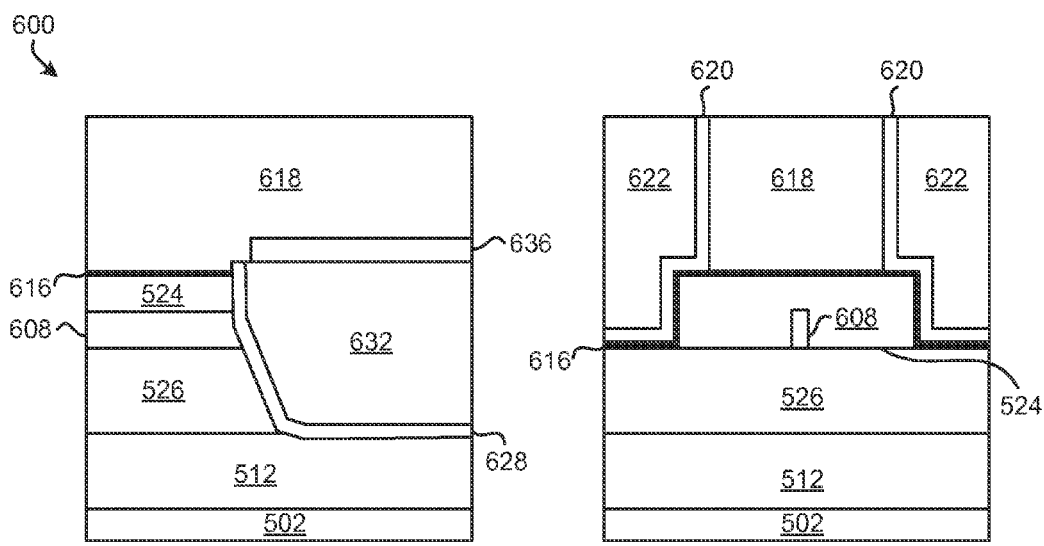
Figure 6P:
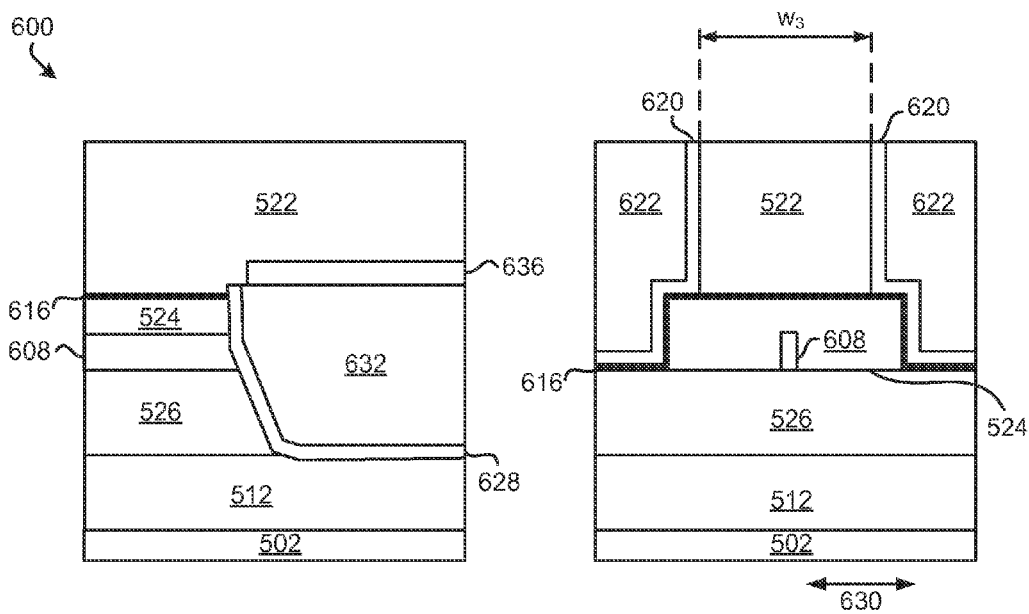
Figure 6Q:
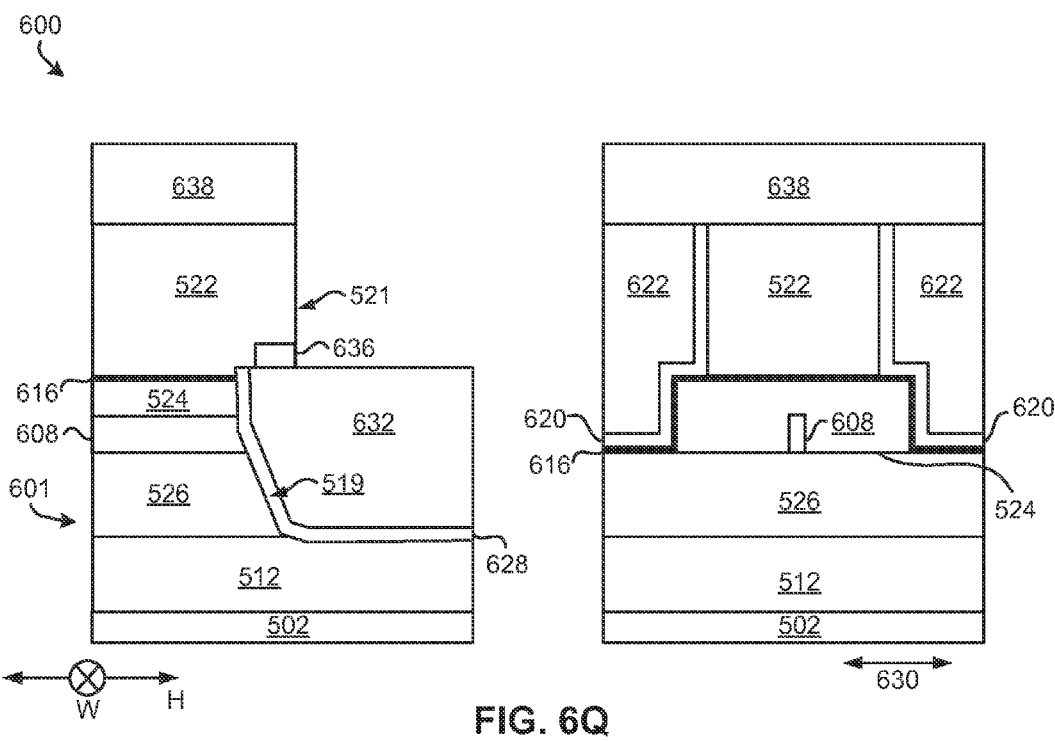
Figure 6R:
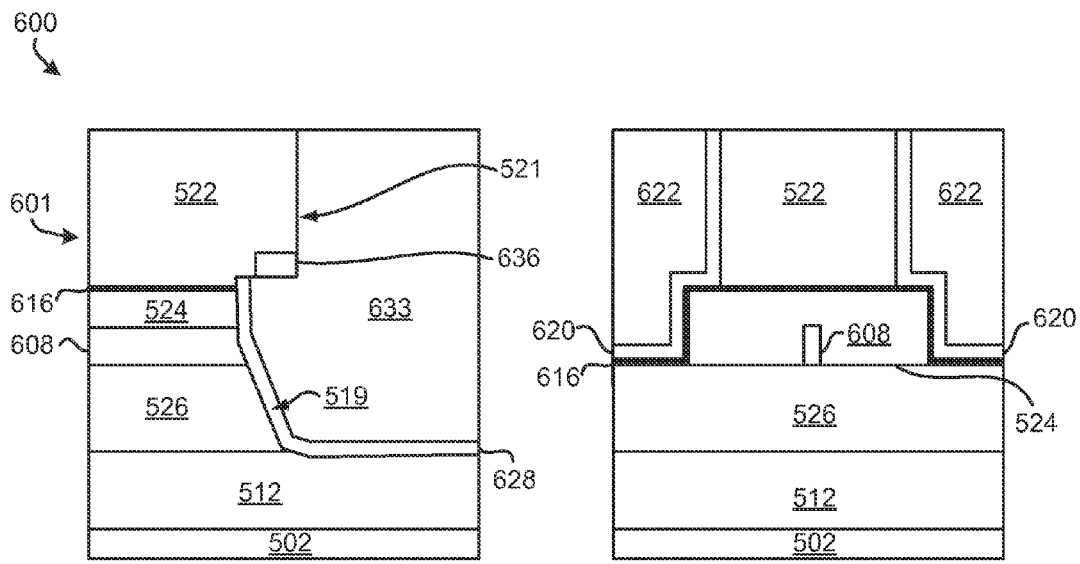
Figure 6S:
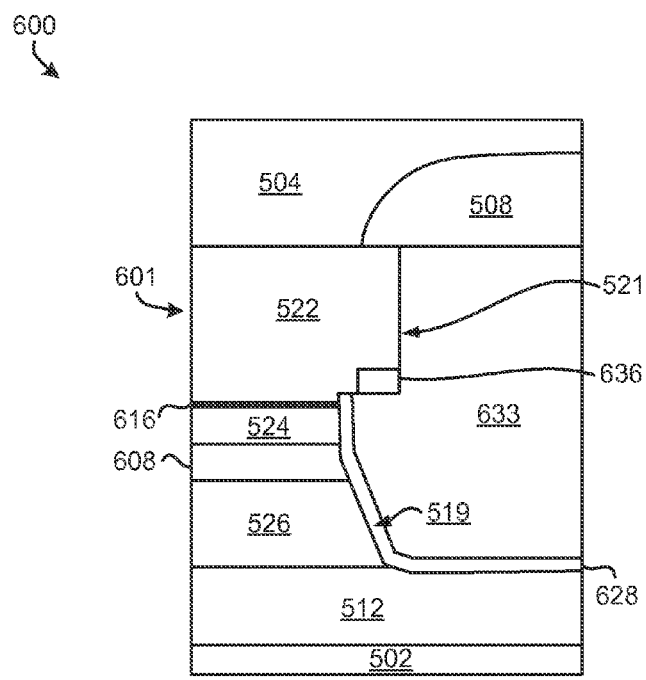

FIGS. 6A-6S depict the process steps of a method for forming an apparatus 600 having an NFT, in accordance with one of the embodiments described herein. Specifically, the apparatus 600 formed using the process steps illustrated in FIGS. 6A-6S may desirably include a magnetic lip having a substantially vertical (perpendicular to the plane of deposition) back edge as previously mentioned. Moreover, the layers beneath the magnetic lip of apparatus 600 also have desirable back edges, as will be described in further detail below.

As an option, the present apparatus 600 may be implemented in conjunction with features from any other embodiment listed herein, such as those described with reference to the other FIGS, particularly FIG. 5. Accordingly, various components of FIGS. 6A-6S have common numbering with those of FIG. 5. Of course, however, such apparatus 600 and others presented herein may be used in various applications and/or in permutations which may or may not be specifically described in the illustrative embodiments listed herein. Further, the apparatus 600 presented herein may be used in any desired environment. Moreover, while specific materials and processes are set forth below, this has been done by way of example only, and known equivalent processes and/or materials may be used as would be apparent to one skilled in the art upon reading the present description. Thus FIGS. 6A-6S (and the other FIGS.) may be deemed to include any possible permutation.

Looking to FIG. 6A, a magnetic return pole 502, a lower cladding layer 512, and a conductive metal film main body 526 are deposited, e.g., using ion beam deposition, sputtering, electro plating, etc. or any other conventional process. An additional Chemical Mechanical Planarization (CMP) is preferably performed on the upper surface of the main body 526 of the conductive metal film, e.g., to smoothen the as-deposited surface of the main body 526.

The main body 526 of the conductive metal film forms a portion of a conductive metal film of an NFT structure adjacent the magnetic return pole 502, e.g., see the NFT of FIG. 5. The conductive metal film will eventually include a notch extending from the main body, and a notch diffusion barrier layer interposed between the two, as will be discussed in detail below, e.g., see FIG. 6C.

With continued reference to FIG. 6A, according to one approach, the deposition thickness of the main body 526 may be about 150 nm, but could be higher or lower depending on the desired embodiment.

Referring to FIG. 6B, a notch layer 604 is formed above the aforementioned main body 526 of the conductive metal film.

Looking now to FIG. 6C, a resist 610, e.g., of any type known in the art, is placed over the notch layer 604. Moreover, a subtractive process may be performed on the notch diffusion barrier layer (if present) and notch layer 604. According to various approaches, the subtractive process may include ion milling, but may include other processes that would be apparent to one skilled in the art upon reading the present description, e.g., in view of the materials used in the layers of the apparatus 600.

The subtractive process thereby preferably defines the lateral extent of a notch 604 from the notch layer 604. Thus, as described above, the main body 526 and notch 608 extending from the main body 526 form the conductive metal film of the NFT created in the process steps illustrated in FIGS. 6A-6H.

The notch layer 604 and the main body 526 of the conductive metal film preferably include the same material(s). Illustrative materials for the conductive metal film, having the notch layer 604 and the main body 526, include, but are not limited to, gold, silver, copper, aluminum, etc., and/or alloys thereof.

Looking now to FIG. 6D, the resist 610 is preferably removed from the apparatus 600, and a oxide layer 612 is deposited over the exposed portions of the notch 608 and main body 526. Illustrative materials for the oxide layer 612 may include $SiO_2$, $AlO_x$, $MgF_2$, $CaF_2$, etc., and/or combinations (composites) thereof.

To define the upper surface of the oxide layer 612, a CMP and Reactive-Ion Etching (RIE) combination is preferably performed on the oxide layer 612. However, in other approaches, supplemental and/or alternative process steps may be performed on the upper surface of the oxide layer 612.

As shown in FIG. 6E, a second resist 614 is lithographically patterned on top of the oxide layer 612, whereby a subtraction process may be performed on the apparatus 600. The subtraction process thereby preferably defines the lateral extent of an aperture 524 from the oxide layer 612 positioned above the main body 526 of the conductive metal film. According to various approaches, the subtractive process may include any of those described above with reference to FIG. 6C.

The lateral extent $w_2$ of the aperture 524 may be about 300 nm, more preferably between about 250 nm and about 500 nm, but could be higher or lower. Additionally, the deposition thickness $t_3$ between the top of the notch 608 and the diffusion barrier 616 may be between about 10 nm and about 150 nm, more preferably between about 20 nm to about 100 nm, but could be higher or lower depending on the desired embodiment.

As illustrated, the aperture 524 may have a C-shaped profile in some approaches. As also illustrated, the conductive metal film (526, 608) has an inverted T-shape.

In alternative approaches, the conductive metal film (526, 608) may have an "E" shape (e.g., also known as an E-antenna shape), whereby wings (not shown) extend upwardly from opposite ends of the main body 526. Although not illustrated, the E shaped conductive metal film may act as a plasmonic device with a field enhancing notch, similar to the T-shaped conductive film as described herein, but is not limited thereto.

Referring now to FIG. 6F, a metallic layer 616 is deposited over the exposed portions of the aperture 524 and the main body 526. The metallic layer 616 acts as a diffusion barrier between the aperture 524 and the magnetic lip 522. It should be noted that although the metallic layer 616 is shown in the present embodiment as being deposited over the exposed portions of the aperture 524 and the main body 526, a metallic layer may be deposited in alternate configurations. Thus, according to different embodiments, a diffusion barrier layer may be positioned differently within an apparatus, e.g., see FIGS. 9A-9C.

Referring now to FIG. 6G, a hard mask, here of two layers 624, 626, is deposited above a portion of the metallic layer 616 as illustrated. According to an exemplary approach, a first of the hard mask layers 624 my include carbon. Moreover, a second of the hard mask layers 626 may include duramide or any similar resist material. However, depending on the desired approach, either of the hard mask layers 624, 626 of the dual layer hard mask may include any desired hard mask material as would be appreciated by one skilled in the art upon reading the present description.

Following the deposition of the dual layer hard mask 624, 626, multiple subtractive processes may be performed on the structure in order to form a desired back edge thereof as previously mentioned. Looking to FIG. 6H, an ion milling process is performed which effectively removes the exposed portions of the metallic layer 616 (diffusion barrier layer). The ion milling process is followed by a reactive-ion etch (RIE) which removes the exposed portions of the aperture 524. However, in some approaches, a subsequent ion milling process may be performed in place of the aforementioned RIE. Regardless of whether a RIE or ion milling process is performed on the exposed portions of the aperture 524, it is preferred that this operation forms a desired straight back edge of the aperture 524.

Referring still to FIG. 6H, another ion milling process is performed on the structure, thereby selectively removing exposed portions of the notch 608 and main body 526. As depicted, the subtractive processes performed on the apparatus 600 results in the notch 608 and main body 526 as having an angled back edge. As described above, an angled back edge for main body 526, as well as the notch 608, results in improved efficiency and performance of the final apparatus structure.

Furthermore, a portion of a back edge of the aperture 524 positioned closest to the back edge of the conductive metal film main body 526 is about aligned with the upper portion of the back edge of the conductive metal film main body 526. Thus, a continuous back edge is desirably defined between the aperture 524, notch 608 and conductive metal film main body 526 along a back edge thereof, e.g., farthest from a media facing surface 601 of the apparatus 600.

According to still further approaches, although not shown in the present embodiment, a back edge of the aperture 524 may be positioned farther from a media facing surface 601 than an upper portion of a back edge of the conductive metal film main body 526.

Thus, by implementing multiple subtractive processes, a desirable back edge is achieved. However, it should be noted that although an exemplary sequence of subtractive processes are described in relation to the present embodiment, alternate processes and/or structures may also result in a desirable NFT back edge, e.g., see FIGS. 7A-8B.

Looking to FIG. 6I, some or all of the dual layer hard mask 624, 626 of FIG. 6H is stripped and a cladding layer 628 e.g. of $SiO_2$ is deposited over the exposed portions of the apparatus 600 structure. Furthermore, a partial waveguide layer 632 e.g. of $TaO_x$ is deposited over the cladding layer 628. Although a layer 628 of $SiO_2$ and a layer 632 of $TaO_x$ are described in the present embodiment, the layers 628, 632 may include any material suitable for forming the cladding and/or waveguide of the apparatus, e.g., see 506 of FIG. 5.

As illustrated in FIG. 6J, a CMP planarization is performed on the apparatus 600. A carbon stop layer (not shown) is preferably used in combination with the CMP planarization as would be appreciated by one skilled in the art upon reading the present description. Furthermore, a hard mask 634 is deposited above the planarized surface of the apparatus 600 as illustrated in FIG. 6K. According to one approach, the hard mask 634 may include chromium, but is in no way limited thereto.

Referring now to FIG. 6L, a hard mask deposition wet etch and a diamond like carbon (DLC) RIE process are performed on the apparatus 600 thereby removing the hard mask 634 of FIG. 6K in addition to hard mask layer 624. Thereafter, a DLC protection layer 636 may be deposited over a portion of the upper surface of the apparatus 600 as illustrated in FIG. 6M.

Once the DLC protection layer 636 has been deposited, a series of process operations may be performed on the apparatus 600. According to an exemplary embodiment, which is in no way intended to limit the invention, a photo step, DLC RIE and/or resist strip may be performed on the apparatus 600 as shown in FIG. 6M. However, depending on the desired embodiment, additional or fewer process steps may be implemented as would be appreciated by one skilled in the art upon reading the present description.

Looking now to FIG. 6N, a resist 618 may be patterned above the diffusion barrier 616, whereby a wraparound layer 620 and heat sink 622 may be formed.

The resist 618 may include any conventional material as would be appreciated by one skilled in the art upon reading the present description. Moreover, the wraparound layer 620 and the heat sink 622 preferably include one or more materials with high thermal conductivity such as Au, Ag, Cu, Ta, Ti, Cr, etc. However, in other embodiments the wraparound layer 620 and/or heat sink 622 may include any other desirable materials.

Moving to FIG. 6P, the resist 618 is preferably removed using a combination of subtractive processes that may include ion milling, reactive ion etch and wet etching. Magnetic lip 522 is then deposited in the void created after removal of resist 618. As a result, the magnetic lip 522 is formed above the aperture 524 and the conductive metal film main body 526.

Depending on the desired embodiment, the magnetic lip 522 may be formed using sputtering, plating, or any of the other methods described herein and/or which would be apparent to one skilled in the art upon reading the present description. According to an example, which is in no way intended to limit the invention, the magnetic lip 522 may be formed by implementing a seed layer deposition, which may be followed by plating for the magnetic lip. Following the plating, the magnetic lip 522 material may be deposited such that it fills the void, after which a CMP operation may be performed to planarize the resulting structure.

In various embodiments, the magnetic lip 522 may include any of the materials listed above with reference to FIG. 5. However, in further approaches, the magnetic lip 522 may include any suitable magnetic alloy, including Co, Fe, Ni, etc., and/or combinations thereof. The width $w_3$ of the magnetic lip 522 in a cross track direction 630 may be between about 150 nm and about 500 nm, but could be higher or lower depending on the desired embodiment.

Referring now to FIG. 6Q, a resist 638 is deposited on an upper surface of the apparatus 600. The resist 638 may include duramide or any similar resist material. Furthermore, subtractive processes are performed on the apparatus 600 which may thereby define the back edge of the magnetic lip 522. According to an exemplary embodiment, which is in no way intended to limit the invention, the subtractive processes performed on the apparatus may include a RIE process to remove portions of the resist 638 (e.g., a duramide RIE), an ion milling process and/or a DLC RIE. As a result, the back edge of the magnetic lip 522 is formed such that it is substantially vertical, e.g., in a direction perpendicular to the plane of deposition thereof, i.e., in the height H and width W direction (into the page).

It should be noted that processing techniques used to form structures such as apparatus 600 have fabrication error ranges. Thus, the dimensional values of a given structure may vary from their intended values by any amount in the error range depending on the approach. According to the present embodiment, the fabrication error range may be about ±50 nm, but could be higher or lower depending on operating conditions, materials, etc. Thus, in other embodiments, the fabrication error range may be about ±10 nm.

Therefore, referring still to FIG. 6Q, it is preferred that the back edge 521 of the magnetic lip 522 is positioned farther from a media facing surface 601 of the apparatus 600 than an upper portion of a back edge 519 of the conductive metal film main body 526. The separation between a back edge 521 of the magnetic lip 522 and a back edge 519 of the main body 526 may be at least 50 nm, e.g., to compensate for the fabrication error range which may reach −50 nm. Thus, even if the back edge of the magnetic lip 522 were to be formed with a fabrication error of −50 nm (towards the media facing side 601), the back edge of the magnetic lip 522 and a back edge of the main body 526 would be about aligned with each other, e.g., at portions thereof closest together. However, as previously mentioned, the fabrication error range may be about ±10 nm in some embodiments, in which case the back edge of the magnetic lip 522 may be positioned at least about 10 nm farther from a media facing surface 601 of the apparatus 600 than an upper portion of a back edge 519 of the conductive metal film main body 526.

Moving now to FIG. 6R, resist 638 is stripped from apparatus 600, and a subsequent layer (e.g., preferably including $TaO_x$) is deposited, thereby forming partial waveguide 632 into waveguide 633, e.g., using sputtering or any other conventional technique. As shown, the waveguide 633 is formed behind (e.g., away from) the back edge of the conductive metal film main body 526 relative to the media facing surface 601 according to the present embodiment. Moreover, a CMP operation is performed on apparatus 600 thereby defining the top surface thereof as depicted in FIG. 6R.

Finally, FIG. 6S depicts a finalized apparatus 600 having a main pole 504 and top cladding layer 508 (e.g., AlOx) added thereto. As illustrated, a back edge 521 of the magnetic lip 522 is positioned farther from a media facing surface 601 than an upper portion of a back edge 519 of the conductive metal film main body 526. Moreover, a portion of a back edge of the aperture 524 positioned closest to the back edge 519 of the conductive metal film main body 526 is about aligned with the upper portion of the back edge 519 of the conductive metal film main body 526, thereby defining a continuous back edge between the aperture 524 and conductive metal film main body 526.

As previously mentioned, various embodiments described herein include different process steps for achieving a preferred NFT structure. FIGS. 7A-7D depict the process steps of a method for forming an apparatus 700 having an NFT, in accordance with an alternate embodiment to that illustrated in FIGS. 6A-6S. Accordingly, the apparatus 700 formed using the process steps illustrated in FIGS. 7A-7D may also desirably include a magnetic lip having a substantially vertical (e.g., perpendicular to the plane of deposition) back edge as previously mentioned. Moreover, the layers beneath the magnetic lip of apparatus 700 also have desirable back edges, as will be described in further detail below.

As an option, the present apparatus 700 may be implemented in conjunction with features from any other embodiment listed herein, such as those described with reference to the other FIGS, particularly FIGS. 5-6S. Accordingly, various components of FIGS. 7A-7D have common numbering with those of FIGS. 5-6S. Of course, however, such apparatus 700 and others presented herein may be used in various applications and/or in permutations which may or may not be specifically described in the illustrative embodiments listed herein. Further, the apparatus 700 presented herein may be used in any desired environment. Moreover, while specific materials and processes are set forth below, this has been done by way of example only, and known equivalent processes and/or materials may be used as would be apparent to one skilled in the art upon reading the present description. Thus FIGS. 7A-7D (and the other FIGS.) may be deemed to include any possible permutation.

Figure 7A:
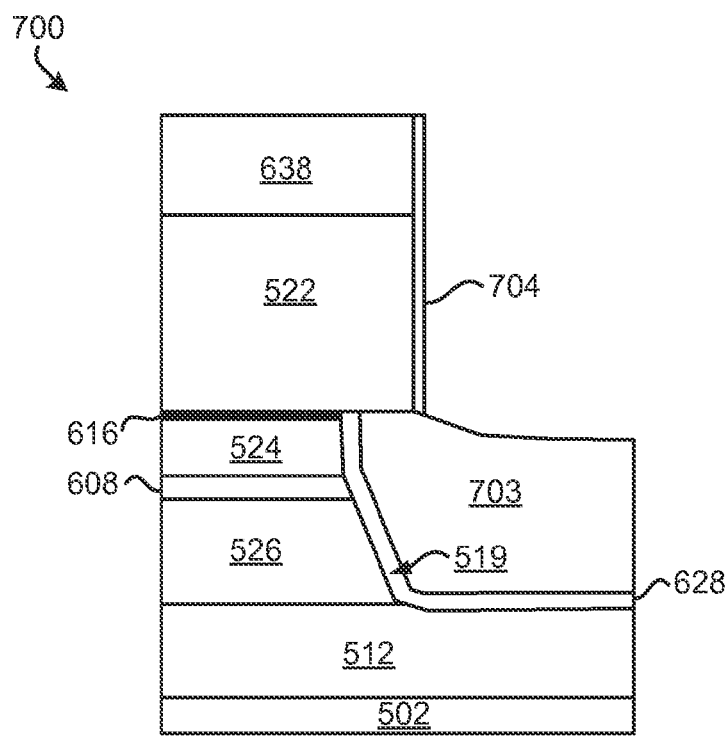
FIGS. 7A-7D are partial cross sectional side views of process steps for forming a HAMR write head according to one embodiment.

Looking to FIG. 7A, it should be noted that apparatus 700 is shown at a similar stage as apparatus 600 illustrated in FIG. 6Q. It follows that apparatus 700 as illustrated in FIG. 7A may be formed using the same or similar operations as those presented in FIGS. 6A-6Q, and therefore may include the same or similar layers, which again, are represented with common numbering to those of FIGS. 6A-6Q. However, a significant difference between the embodiment illustrated in FIG. 6Q and the embodiment illustrated in FIG. 7A is that apparatus 700 does not use a DLC protection layer and also includes a partial waveguide layer 703 having $SiO_x$ as opposed to partial waveguide layer 632 of FIG. 6Q having $TaO_x$. Referring still to FIG. 7A, having a partial waveguide layer 703 which includes $SiO_x$ rather than $TaO_x$ (e.g., as seen in FIG. 6Q) may improve the waveguide performance of the final structure as illustrated in FIG. 7D, as will soon become apparent.

Moreover, a conformal Cr layer 704 is deposited on the extended portions of the magnetic lip 522 and resist 638. Thereafter an ion milling process is performed on the apparatus 700 at an angle of about 0 degrees relative to a plane of deposition of the magnetic lip 522, the result of which is illustrated in FIG. 7A, in which the Cr layer 704 remains at the back edge of the magnetic lip 522 and resist 638, but is removed from the top surface of partial waveguide layer 703. Next, a $SiO_2$ RIE process is performed that results in the structure of FIG. 7B.

Figure 7B:
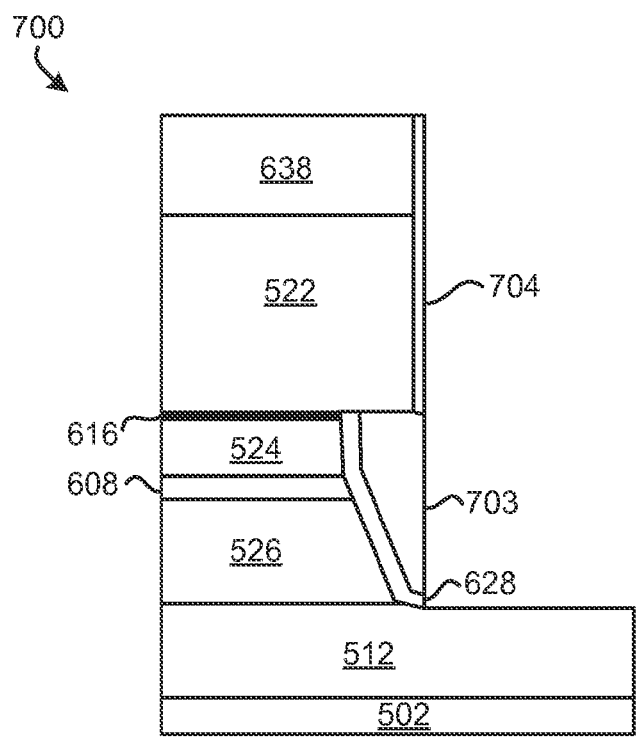
Figure 7C:
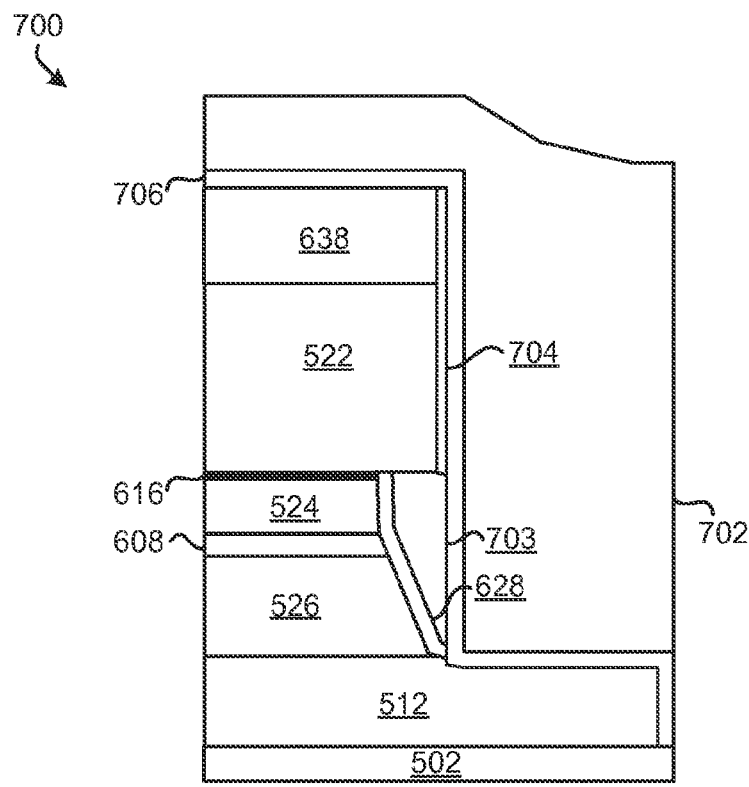

Looking to FIG. 7C, a cladding layer 706 (e.g., including $SiO_2$) is deposited on exposed surfaces of the apparatus 700, after which a $TaO_x$ deposition process is performed, thereby forming the waveguide 702.

Figure 7D:
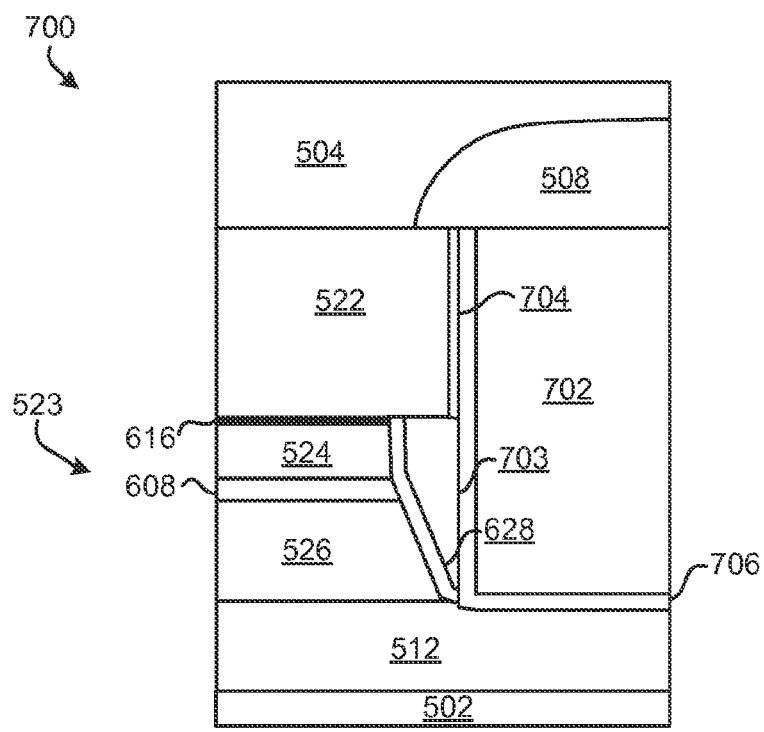

The final structure of apparatus 700 is illustrated in FIG. 7D. As shown, resist 638 of FIG. 7C has been removed, and waveguide 702 has been planarized along with cladding layer 706. It should be noted that waveguide 702 and partial waveguide layer 703 together form a complete waveguide structure, e.g., which delivers an optical signal to the NFT 523. Moreover, as previously mentioned, partial waveguide layer 703 preferably includes $SiO_x$ while waveguide 702 includes $TaO_x$. The interface between the different materials of waveguide layers 702, 703 may actually further improve waveguide performance during operation.

A main pole 504 and top cladding layer 508 have also been added to apparatus 700, e.g., similar to the embodiment shown in FIG. 6S.

Figure 8A:
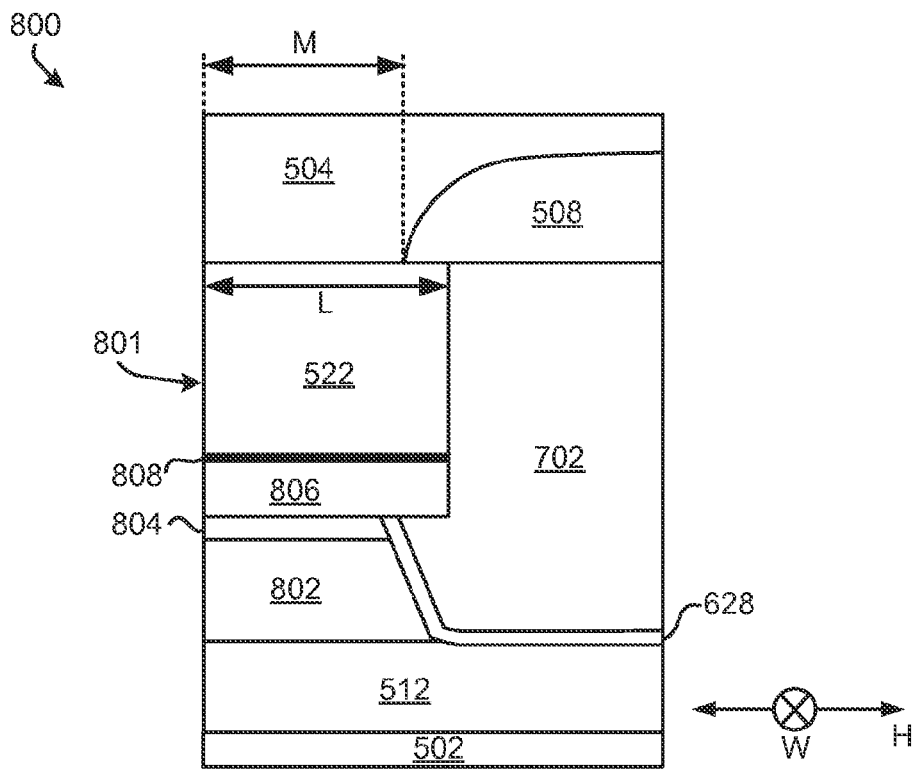
FIG. 8A is a partial cross sectional side view of a HAMR write head according to one embodiment.
Figure 8B:
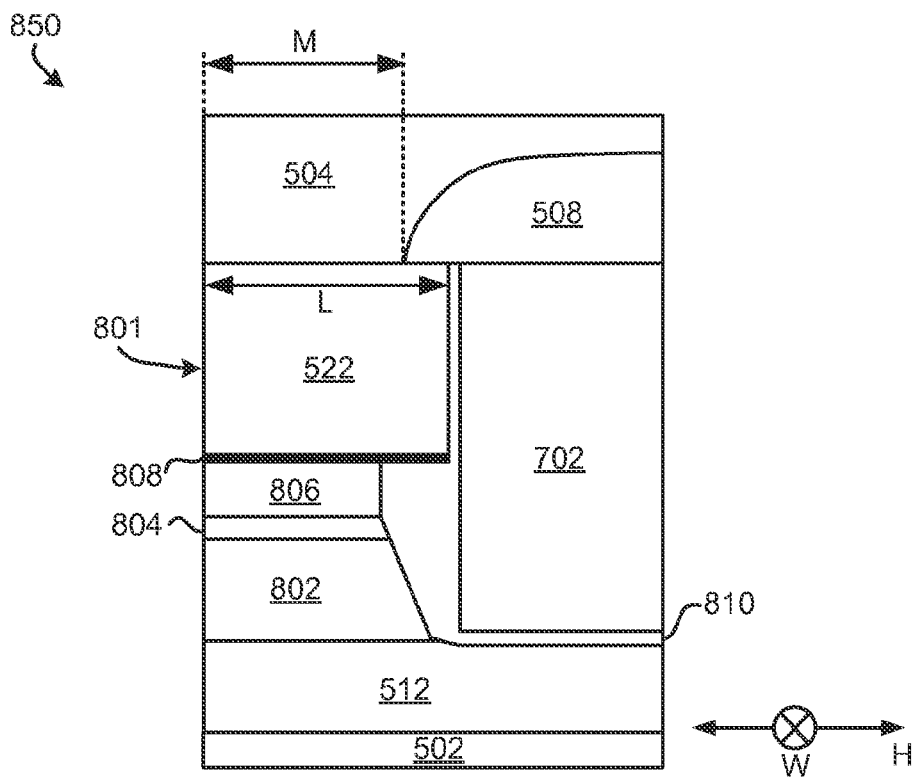
FIG. 8B is a partial cross sectional side view of a HAMR write head according to one embodiment.

Further still, FIGS. 8A-8B depict the result of implementing process steps of a method for forming apparatuses 800, 850 having an NFT, in accordance with additional embodiments. Specifically, the apparatuses 800, 850 formed using the process steps illustrated in FIGS. 8A-8B may desirably include a magnetic lip having a substantially vertical (e.g., perpendicular to the plane of deposition) back edge as previously mentioned. Moreover, the layers beneath the magnetic lip of apparatuses 800, 850 also have desirable back edges, as will be described in further detail below.

As an option, the present apparatuses 800, 850 may be implemented in conjunction with features from any other embodiment listed herein, such as those described with reference to the other FIGS, particularly FIGS. 5-7D. Accordingly, various components of FIGS. 8A-8B have common numbering with those of FIGS. 5-7D. Of course, however, such apparatuses 800, 850 and others presented herein may be used in various applications and/or in permutations which may or may not be specifically described in the illustrative embodiments listed herein. Further, the apparatuses 800, 850 presented herein may be used in any desired environment. Thus FIGS. 8A-8B (and the other FIGS.) may be deemed to include any possible permutation.

The embodiment illustrated in FIG. 8A is a result of patterning the back edge of the conductive metal film main body at a different time than the back edge of the aperture. According to an example, which is in no way intended to limit the invention, the conductive metal film main body 802 and notch 804 may be deposited and patterned. Thereafter, the aperture 806 and magnetic lip 522 may be deposited above the patterned conductive metal film main body 802 and notch 804. Once deposited, the back edge of both the aperture 806 and magnetic lip 522 may be patterned while the conductive metal film main body 802 and notch 804 are protected, e.g., to prevent the previously patterned back edge of the main body 802 and notch 804 from being negatively affected.

It follows that the resulting structure is different than those illustrated in FIGS. 6S and 7D. Specifically, the apparatus 800 shown in FIG. 8A includes the back edge of the aperture 806 and diffusion barrier layer 808 extend such that they are flush with the back edge of the magnetic lip 522. In other words, the back edge of the aperture 806 is about aligned with the back edge of the magnetic lip 522 at portions thereof closest together.

The final structure is a result, at least in part, of the fact that the aperture 806 and magnetic lip 522 are patterned together (e.g., at the same time). In some embodiments, this may result in further reduction or even elimination of shadowing caused by the aperture 806 which may otherwise occur.

According to yet further approaches, which are in no way intended to limit the invention, the aperture 806 may overlie the back edge of the magnetic lip 522. The back edge of the aperture 806 and the back edge of the conductive metal film main body 802 may lie along a common plane oriented along a plane of deposition of the conductive metal film, i.e., in the height H and width W direction (into the page).

Referring now to FIG. 8B, apparatus 850 is shown according to a similar embodiment having the back edges of the aperture 806 and diffusion barrier layer 808 extend such that they are flush with the back edge of the magnetic lip 522. However, apparatus 850 includes a thicker cladding layer 810, e.g., as shown in FIG. 7B, which differs from cladding layer 628 of apparatus 800 of FIG. 8A.

The final structure of apparatus 850 is a result, in part, of the fact that the aperture 806 and magnetic lip 522 are patterned together (e.g., at the same time). As a result, the present embodiment may cause further reduction or even elimination of shadowing caused by the aperture 806 which may otherwise occur as mentioned above.

It should further be noted that since the magnetic lip and antenna layer are patterned in two different lithography steps, the overlay of magnetic lip back-edge and antenna back-edge becomes critical. One solution is to increase the throat height of the magnetic lip compared to the antenna throat height in an attempt to reduce the risk of having the magnetic lip throat height be less than (e.g., smaller than) the antenna throat height. Similarly, overlay challenges may be encountered when the magnetic main pole 504 is defined on the magnetic lip 522. Looking to FIGS. 8A and 8B, the dimension L measured from a media facing surface 801 to the back edge of the magnetic lip 522, is the throat height of magnetic lip 522 and the dimension M measured from a media facing surface 801 to the back edge of the main pole 504 is the throat height of main pole 504. Table 2 outlines the impact of incorporating dimensions L, M having different values relative to each other. Without wishing to limit the invention, it should be noted that the values presented in Table 2 correspond to the provision that the throat height of layer 802 is 110 nm.

TABLE 2

| L (nm) | M (nm) | H - media facing surface (kOe) | H - perp (kOe) |
|---|---|---|---|
| 110 | 110 | 9137 | 5054 |
| 110 | 160 | 9217 | 5156 |
| 160 | 110 | 8936 | 5009 |
| 160 | 160 | 9560 | 5511 |
| 160 | 210 | 9560 | 5550 |
| 210 | 110 | 8515 | 4750 |
| 210 | 160 | 9228 | 5331 |
| 210 | 210 | 9636 | 5662 |

As shown, an about 10% increase in magnetic performance is achievable when using dimensions L, M of about 160 nm rather than 110 nm (e.g., H-perp of 5054 at 110 nm relative to H-perp of 5511 at 160 nm). However, as previously mentioned, the results illustrated in Table 2 correspond to an exemplary embodiment and may vary depending on the materials, external characteristics, etc., associated with other embodiments.

It follows that various embodiments disclosed and/or suggested herein are able to achieve a desirable linear profile back edge angle, which is otherwise unachievable for conventional products. This linear profile back edge angled profile allows for improved efficiency for the different embodiments herein, e.g., particularly for embodiments implementing an E-shaped antenna.

Illustratively, looking to Table 3, the impact of having favorable alignment between the back edge of a magnetic lip and the back edge of a conductive metal film main body are outlined and compared to an ideal embodiment.

TABLE 3

| NFT Configuration | Efficiency | ΔT 500K NFT Power | ΔT 400K NFT Power | Down-Track ΔT | Peak NFT ΔT | Peak Magnetic Lip ΔT |
|---|---|---|---|---|---|---|
| Ideal | 3.70% | 4.01 mW | 42 nm | 9.2K/nm | 90K | 95K |
| Tested Embodiment | 3.64% | 4.09 mW | 42 nm | 9.3K/nm | 85K | 89K |

Columns 2, 6 and 7 (moving left to right) are particularly important in describing the effects of the aforementioned misalignment. While column 2 outlines the achieved optical efficiency of the NFT, columns 6 and 7 denote the peak temperatures at two different locations: 1) the NFT and 2) the magnetic lip, respectively. Thus, the temperatures shown are the raises in temperature that may be expected from room temperature. These results prove that near-ideal improvements over conventional shortcomings are achievable. As a result, various embodiments described herein may be able to prevent the operational temperatures of HAMR heads from reaching values which induce thermal degradation, diffusion, and other undesirable effects to come into play. It follows that, in addition to improving efficiency, the embodiments disclosed herein are able to reduce peak NFT and magnetic lip operating temperatures.

Moreover, any of the approaches described and/or suggested herein may be implemented in embodiments having nanobeak antenna configurations of types known in the art. Thus, process flow(s) similar to and/or the same as any of the embodiments included herein may produce desirable performance results for nanobeak antennas. Further still, various approaches described and/or suggested herein may be implemented in embodiments having front and/or back edge profiles of an NFT antenna which are different than that of a magnetic pole.

It should be noted that methodology presented herein for at least some of the various embodiments may be implemented, in whole or in part, in computer hardware, software, by hand, using specialty equipment, etc. and combinations thereof.

Moreover, any of the dimensions described herein with regard to any of the FIGS. and/or any other embodiment thereof, may be higher or lower than the values listed, depending on the particular sizes and shapes of components in such particular embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a near field transducer having a conductive metal film and an aperture; and
a magnetic lip adjacent the aperture;
wherein a back edge of the magnetic lip is positioned farther from a media facing surface than an upper portion of a back edge of the conductive metal film.

2. The system as recited in claim 1, wherein a portion of a back edge of the aperture positioned closest to the back edge of the conductive metal film is about aligned with the upper portion of the back edge of the conductive metal film.

3. The system as recited in claim 1, wherein a back edge of the aperture is positioned farther from a media facing surface than an upper portion of a back edge of the conductive metal film.

4. The system as recited in claim 3, wherein the back edge of the aperture is about aligned with the back edge of the magnetic lip.

5. The system as recited in claim 3, wherein the aperture overlies the back edge of the magnetic lip, wherein the back edge of the aperture and the back edge of the conductive metal film lie along a common plane oriented along a plane of deposition of the conductive metal film.

6. The system as recited in claim 1, wherein a back edge angle of the back edge of the conductive metal film is between 0 and 30 degrees.

7. A system, comprising:
a near field transducer having a conductive metal film and an aperture;
a magnetic lip adjacent the aperture; and
a waveguide positioned behind the back edge of the conductive metal film relative to the media facing surface,
wherein a back edge of the magnetic lip is positioned farther from a media facing surface than an upper portion of a back edge of the conductive metal film.

8. The system as recited in claim 1, wherein the aperture has a C-shaped profile.

9. The system as recited in claim 1, wherein the conductive metal film has a circular cross sectional shape with a notch extending therefrom.

10. The system as recited in claim 1, wherein the back edge of the magnetic lip is positioned at least 10 nm farther from a media facing surface than an upper portion of a back edge of the conductive metal film.

11. The system as recited in claim 1, wherein the conductive metal film is selected from a group consisting of gold, a gold alloy, silver, a silver alloy, aluminum, an aluminum alloy, copper, and a copper alloy.

12. A magnetic data storage system, comprising:
at least one magnetic head having the near field transducer and magnetic lip as recited in claim 1;
a magnetic medium;
a drive mechanism for passing the magnetic medium over the at least one magnetic head; and
a controller electrically coupled to the at least one magnetic head for controlling operation of the at least one magnetic head.

13. A method, comprising:
forming a conductive metal film;
forming an aperture adjacent to the conductive metal film;
forming a magnetic lip adjacent to the aperture; and
forming a waveguide behind the back edge of the conductive metal film relative to the media facing surface;
wherein a back edge of the magnetic lip is positioned farther from a media facing surface than an upper portion of a back edge of the conductive metal film.

14. The method as recited in claim 13, wherein a portion of a back edge of the aperture positioned closest to the back edge of the conductive metal film is about aligned with the upper portion of the back edge of the conductive metal film.

15. The method as recited in claim 13, wherein a back edge of the aperture is positioned farther from a media facing surface than an upper portion of a back edge of the conductive metal film.

16. The method as recited in claim 15, wherein the back edge of the aperture is about aligned with the back edge of the magnetic lip.

17. The method as recited in claim 13, wherein a back edge angle of the back edge of the conductive metal film is between 0 and 30 degrees.

18. The method as recited in claim 13, wherein the back edge of the magnetic lip is positioned at least 10 nm farther from a media facing surface than an upper portion of a back edge of the conductive metal film.

19. The method as recited in claim 13, wherein the conductive metal film is selected from a group consisting of gold, a gold alloy, silver, a silver alloy, aluminum, an aluminum alloy, copper, and a copper alloy.

* * * * *